(12) United States Patent
Wu

(10) Patent No.: US 10,740,763 B2
(45) Date of Patent: Aug. 11, 2020

(54) BLOCKCHAIN-BASED TRANSACTION PROCESSING METHOD AND APPARATUS

(71) Applicant: ALIBABA GROUP HOLDING LIMITED, Grand Cayman (KY)

(72) Inventor: Hao Wu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/805,507

(22) Filed: Feb. 28, 2020

(65) Prior Publication Data

US 2020/0202310 A1   Jun. 25, 2020

Related U.S. Application Data

(62) Division of application No. 15/933,545, filed on Mar. 23, 2018.

(30) Foreign Application Priority Data

Mar. 29, 2017   (CN) .......................... 2017 1 0198859

(51) Int. Cl.
*G06Q 20/40*   (2012.01)
*G06Q 20/06*   (2012.01)
*G06Q 20/38*   (2012.01)

(52) U.S. Cl.
CPC ............ *G06Q 20/405* (2013.01); *G06Q 20/06* (2013.01); *G06Q 20/3829* (2013.01); *G06Q 2220/00* (2013.01); *H04L 2209/38* (2013.01)

(58) Field of Classification Search
CPC ............................ H04L 2209/38; G06F 16/27
See application file for complete search history.

(56) References Cited

U.S. PATENT DOCUMENTS 7,930,238 B2   4/2011   Frankel
8,165,952 B2   4/2012   Burrell et al.
(Continued)

FOREIGN PATENT DOCUMENTS

CN   105681301 A   6/2016
CN   105809062 A   7/2016
(Continued)

OTHER PUBLICATIONS

Search Report for European Application No. 18777761.0 dated Jan. 15, 2020 (4 pages).
(Continued)

*Primary Examiner* — Jay Huang
(74) *Attorney, Agent, or Firm* — Sheppard Mullin Richter & Hampton LLP

(57) ABSTRACT

A blockchain-based transaction processing method may comprise: in response to a designated account being logged in through an application client, generating, according to input to-be-operated account information and configured operation content, an operation instruction comprising the to-be-operated account information and the operation content; and sending the operation instruction to a node in a blockchain network, causing the node in the blockchain network to invoke a smart contract corresponding to the designated account upon receiving the operation instruction, and to execute an operation according to the operation content on another account corresponding to the to-be-operated account information.

19 Claims, 4 Drawing Sheets

(56) References Cited

U.S. PATENT DOCUMENTS

| | | | |
|---|---|---|---|
| 8,255,687 | B1 | 8/2012 | Pelly et al. |
| 8,478,791 | B2* | 7/2013 | Ganesh .................. G06Q 50/22 |
| | | | 707/803 |
| 8,577,795 | B2 | 11/2013 | Clubb et al. |
| 2002/0194209 | A1 | 12/2002 | Bolosky et al. |
| 2004/0205537 | A1 | 10/2004 | Graham et al. |
| 2006/0206423 | A1 | 9/2006 | Sternard et al. |
| 2009/0271328 | A1 | 10/2009 | Bloom |
| 2010/0250964 | A1* | 9/2010 | Olson .................. G06F 9/30003 |
| | | | 713/190 |
| 2014/0164262 | A1* | 6/2014 | Graham .................. G06Q 10/06 |
| | | | 705/310 |
| 2015/0332283 | A1 | 11/2015 | Witchey |
| 2015/0379510 | A1 | 12/2015 | Smith |
| 2016/0028552 | A1 | 1/2016 | Spanos et al. |
| 2016/0085955 | A1 | 3/2016 | Lerner |
| 2016/0092988 | A1 | 3/2016 | Letourneau |
| 2016/0098730 | A1 | 4/2016 | Feeney |
| 2016/0217436 | A1 | 7/2016 | Brama |
| 2016/0330027 | A1 | 11/2016 | Ebrahimi |
| 2016/0342958 | A1 | 11/2016 | Thomas et al. |
| 2017/0024818 | A1 | 1/2017 | Wager et al. |
| 2017/0046693 | A1 | 2/2017 | Haldenby et al. |
| 2017/0083907 | A1 | 3/2017 | Mcdonough et al. |
| 2017/0085545 | A1 | 3/2017 | Lohe et al. |
| 2017/0140408 | A1* | 5/2017 | Wuehler ............ G06Q 30/0207 |
| 2017/0177898 | A1 | 6/2017 | Dillenberger |
| 2017/0367023 | A1 | 12/2017 | Demchenko |
| 2018/0101842 | A1* | 4/2018 | Ventura .............. G06Q 20/3829 |
| 2018/0144153 | A1* | 5/2018 | Pead .................. G06F 21/6245 |

FOREIGN PATENT DOCUMENTS

| | | |
|---|---|---|
| CN | 105893042 A | 8/2016 |
| CN | 105976231 A | 9/2016 |
| CN | 106452785 A | 2/2017 |
| CN | 106453407 A | 2/2017 |
| CN | 106682983 A | 5/2017 |
| RU | 2649788 C1 | 4/2018 |

OTHER PUBLICATIONS

First Search for Chinese Application No. 201710198859.1 dated Dec. 27, 2019 (1 page).
Anonymous, "White Paper. Ethereum/wiki Wiki. GitHub," Jun. 11, 2015 (24 pages).
Silverberg et al., "Getting Smart: Contracts on the Blockchain," May 2016 (11 pages).
Anonymous, "Public-key cryptography—Wikipedia, the free encyclopedia," Jul. 5, 2015 (24 pages).
Office Action for Canadian Application No. 3053938 dated Oct. 16, 2019 (4 pages).
Non-final rejection and Search Report for Taiwanese Application No. 106139127 dated Sep. 5, 2019 (11 pages).
First Examination Report for Australian Patent Application No. 2018246109 dated Sep. 12, 2019 (2 pages).
PCT International Preliminary Report on Patentability dated Jun. 17, 2019, issued in related International Application No. PCT/US2018/023930 (19 pages).
International Search Report and Written Opinion for Application No. PCT/US2018/023930, dated Jun. 7, 2018, 23 pages.
Office Action for Korean Application No. 10-2019-7026412 dated Mar. 9, 2020.
Examination Report for European Application No. 18777761.0 dated Mar. 27, 2020.
Office Action for Russian Application No. 2019126473 dated Mar. 16, 2020.
Search Report for Russian Application No. 2019126473 dated Feb. 25, 2020.
Supplementary Search Report for Chinese Application No. 201710198859.1 dated Apr. 9, 2020.
Second Office Action for Chinese Application No. 201710198859.1 dated Apr. 15, 2020.

* cited by examiner

BLOCKCHAIN-BASED TRANSACTION PROCESSING METHOD AND APPARATUS

CROSS-REFERENCE TO RELATED APPLICATIONS

The present application is a divisional of and claims priority to U.S. patent application Ser. No. 15/933,545, titled Blockchain-Based Transaction Processing Method and Apparatus, and filed Mar. 23, 2018, which is based on and claims priority to the Chinese Application No. 201710198859.1, filed Mar. 29, 2017, the entire contents of each of which are incorporated herein by reference.

TECHNICAL FIELD

The present application relates to the field of blockchain technologies and information processing technologies, and in particular, to blockchain-based transaction processing methods and apparatuses.

BACKGROUND

Along with the advancement in information technologies, the blockchain technology has attracted extensive attention for advantages of openness, unchangeability, and decentralization. In applications, the blockchain technology is usually applied to store transaction information generated in transaction processes. Moreover, the emergence of smart contracts further expands the scope of transactions for blockchains.

A smart contract is usually a segment of codes stored in a blockchain (or a blockchain node in a blockchain network), which provides execution conditions of the smart contract and transaction processing logic, namely provides conditions to activate the smart contract and how to process transaction processing requests received after the smart contract is activated.

For example, in the case of a transfer transaction, when a user A initiates a transfer processing request, a blockchain node determines whether transfer parameters comprised in the transfer processing request satisfy the execution conditions of a smart contract corresponding to the transfer transaction upon receiving the transfer processing request. If yes, the blockchain node executes the transfer processing request. Here, the execution conditions of a smart contract corresponding to the transfer transaction can be interpreted as whether the balance in the account of the user A meets the required transfer amount and the like. A smart contract is a digital promise entailing rights and duties voluntarily agreed by the parties to the contract.

In real life, however, there is a type of administrative intervention activities in the category of special transactions. For example, when a user performs illegal activities, a court order may be executed to freeze the user's account. However, this operation activity conflicts with smart contracts in existing blockchains and cannot be carried out.

Therefore, there is a need for a blockchain-based transaction processing method that enables special transactions like administrative intervention in a blockchain.

SUMMARY

Embodiments of the present application provide blockchain-based transaction processing methods and apparatuses to provide special transactions like administrative intervention in blockchains, thus overcoming the existing problem.

According to one aspect, a blockchain-based transaction processing method may comprise: in response to a designated account being logged in through an application client, generating, according to input to-be-operated account information and configured operation content, an operation instruction comprising the to-be-operated account information and the operation content; and sending the operation instruction to a node in a blockchain network, causing the node in the blockchain network to invoke a smart contract corresponding to the designated account upon receiving the operation instruction, and to execute an operation according to the operation content on another account corresponding to the to-be-operated account information.

According to another aspect, a blockchain-based transaction processing method implementable by a node in a blockchain network may comprise: acquiring an operation instruction comprising to-be-operated account information and operation content; in response to determining that an account sending the operation instruction corresponds to an account issuing the operation instruction, determining a smart contract corresponding to the account issuing the operation instruction; and based on the smart contract, executing an operation according to the operation content on another account corresponding to the to-be-operated account information.

According to another aspect, a blockchain-based transaction processing apparatus may comprise a processor and a non-transitory computer-readable storage medium storing instructions that, when executed by the processor, cause the apparatus to perform a method. The method may comprise: generating, in response to a designated account being logged in through an application client and according to input to-be-operated account information and configured operation content, an operation instruction comprising the to-be-operated account information and the operation content; and sending the operation instruction to a node in a blockchain network, causing the node in the blockchain network to invoke a smart contract corresponding to the designated account upon receiving the operation instruction, and to execute an operation according to the operation content on another account corresponding to the to-be-operated account information.

According to another aspect, a blockchain-based transaction processing apparatus may comprise a processor and a non-transitory computer-readable storage medium storing instructions that, when executed by the processor, cause the apparatus to perform a method. The method may comprise: acquiring an operation instruction comprising to-be-operated account information and operation content; in response to determining that an account sending the operation instruction corresponds to the account issuing the operation instruction, determining a smart contract corresponding to the account issuing the operation instruction; and executing, based on the smart contract, an operation according to the operation content on another account corresponding to the to-be-operated account information.

At least one technical solution employed above by the embodiments of the present disclosure can achieve the following advantageous effects.

In some embodiments, corresponding smart contracts are created for different administrative supervision accounts (also referred to as designated accounts). In this way, upon receiving an operation instruction sent from a designated account, a node in a blockchain network can invoke a corresponding smart contract when determining that the operation instruction is issued legally, to execute corresponding operations on an account corresponding to the to-be-operated account information, which achieves supervision on accounts in the blockchain and enables special transactions like administrative intervention in a blockchain.

BRIEF DESCRIPTION OF THE DRAWINGS

The accompanying drawings described herein are used to provide a further understanding of the present disclosure. The illustrative embodiments of the present application and the description thereof are merely exemplary and do not limit the scope of the present disclosure. In the accompanying drawings.

DETAILED DESCRIPTION

The technical solutions of the present application will be clearly and completely described below with reference to various embodiments of the present disclosure and corresponding drawings. The described embodiments are merely exemplary. All other embodiments obtainable by a person skilled in the art without inventive effort and on the basis of the embodiments of the present disclosure shall be encompassed by the scope of the present disclosure.

The technical solutions according to embodiments of the present disclosure will be described in detail below with reference to the accompanying drawings.

Figure 1:
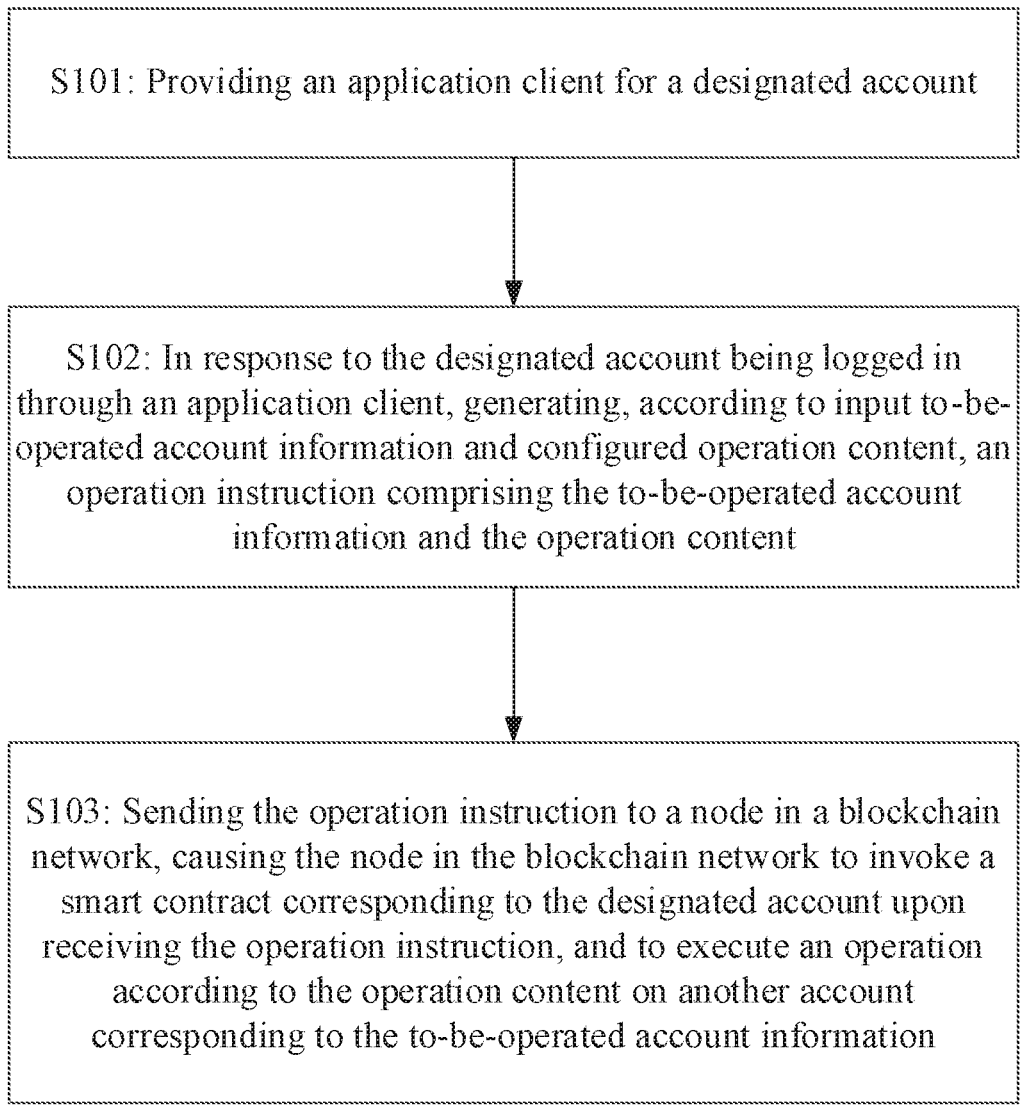
FIG. 1 illustrates a blockchain-based transaction processing method according to an embodiment of the present disclosure.

FIG. 1 illustrates a blockchain-based transaction processing method according to an embodiment of the present disclosure, and the transaction processing method may include the following steps. One or more steps such as S101 may be optional.

S101: providing an application client for a designated account.

The designated account in embodiments of the present disclosure may comprise a special account with administrative supervision capabilities. To ensure the security of the designated account, a dedicated application client (e.g., a software application) may be provided for the designated account.

A designated account may use the same application client or different application clients for different administrative supervision capabilities. In other words, an application client can be provided to support the use thereon by designated accounts with a variety of administrative supervision capabilities, and different designated accounts can invoke corresponding functions according to their own needs. Furthermore, different application clients can be provided according to the needs of designated accounts, and each application client is used exclusively for a designated account, which is not limited herein.

S102: in response to the designated account being logged in through the application client, generating, according to input to-be-operated account information and configured operation content, an operation instruction comprising the to-be-operated account information and the operation content.

In one embodiment, when an administrative supervision official needs to perform administrative supervision on one account, he/she needs to complete a login operation through the application client in the step S101, namely by inputting a name and a login password of a designated account matching the administrative supervision authorization of the administrative supervision official on a login interface of the application client. At this moment, the application client can verify the input name and login password of the designated account, and allow the login to be completed when the verification is passed. In this way, it can ensure the security of implementation of the administrative supervision in an Internet environment.

When the designated account is logged in through the application client, the administrative supervision official can input account information in need of administrative supervision (the account information herein is hereinafter referred to as the to-be-operated account information) and operation content on an operating interface provided by the application client. Upon receiving the input to-be-operated account information and configured operation content, the application client can generate an operation instruction comprising the to-be-operated account information and the operation content according to the input to-be-operated account information and configured operation content.

In one embodiment, when generating the operation instruction, the method may further comprises: using an algorithm to determine a summary of the operation instruction, and using a private key in a public-private key pair corresponding to the designated account to encrypt the summary to obtain an encrypted summary.

The algorithm herein may be a Hash algorithm and may also be other algorithms, which is not limited herein.

In some embodiments, a set of public-private keys is determined for different designated accounts. Namely, different designated accounts have different corresponding public-private key pairs, which can effectively prevent leakage of the public-private key pairs.

S103: sending the operation instruction to a node in a blockchain network, causing the node in the blockchain network to invoke a smart contract corresponding to the designated account upon receiving the operation instruction, and to execute an operation according to the operation content on another account corresponding to the to-be-operated account information.

In one embodiment, if an encrypting processing is performed on the operation instruction, the encrypted summary and the operation instruction need to be sent to a node in the blockchain when executing S103.

In one embodiment, the method further comprises: configuring smart contracts for different designated accounts according to attributes of the designated accounts, the smart contracts being used to execute operations according to operation instructions sent by the designated accounts, and different designated accounts having different corresponding smart contracts.

Smart contracts are an important content of transaction execution in a blockchain network. Smart contracts are created for different designated accounts in various embodiments of the present disclosure. Different smart contracts are created according to different attributes of the designated accounts, e.g., characteristics of the sent operation instructions. Triggering conditions and transaction processing logic are prescribed in each smart contract. The transaction processing logic herein may be determined according to the operation content of an operation instruction. The triggering conditions herein may be determined according to actual needs. For example, when an operation instruction is received, whether the current operation is legal, reasonable, and the like is determined.

In some embodiments, a smart contract is recorded in a block in the form of smart contract address. When a node needs to invoke the smart contract, the node can acquire the contents of the smart contract through the address of the smart contract.

Here, with respect to the address of a smart contract, the smart contract can be stored in the node where a corresponding designated account is at, which also assigns a storage address to the smart contract. Alternatively, a third party apparatus provides a storage address for the smart contract, which is not limited herein. There are many implementation manners with respect to the storage process of the above smart contract, the form of the smart contract when stored in a blockchain (whether only the address of the smart contract is stored).

Figure 2:
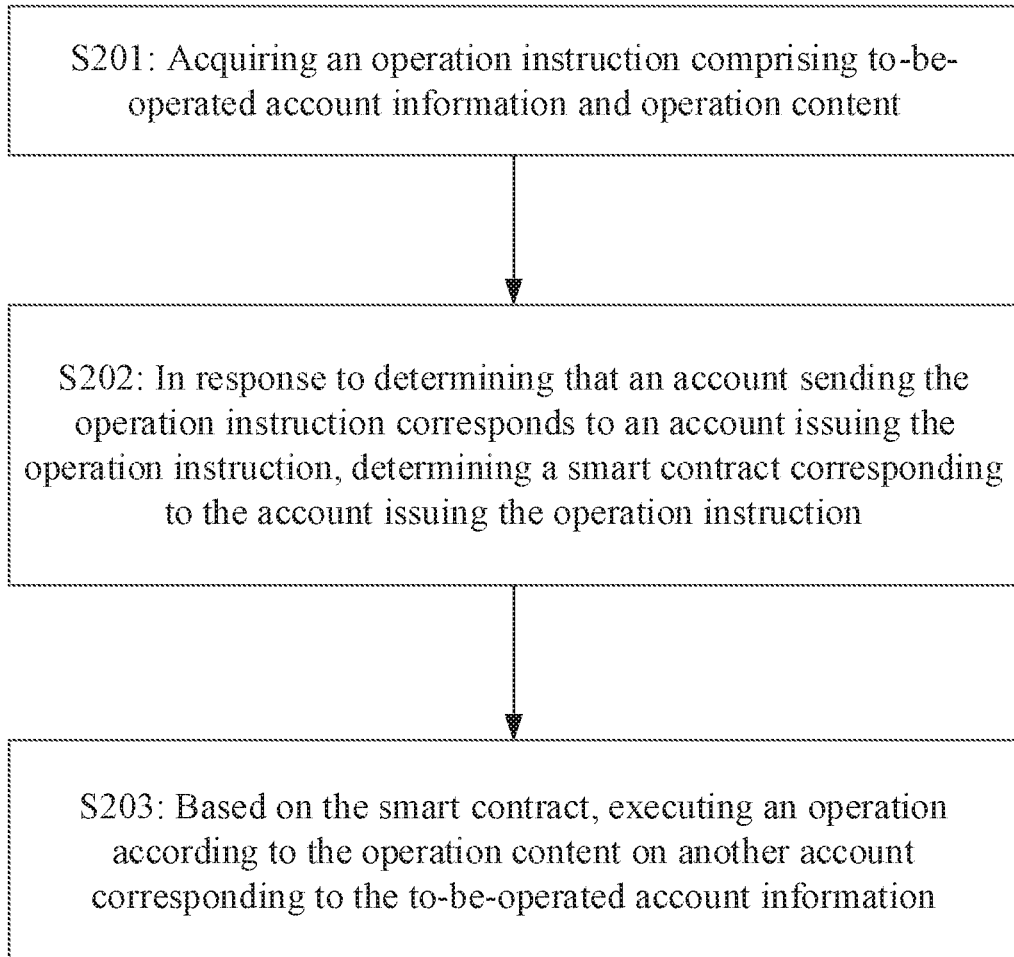
FIG. 2 illustrates a blockchain-based transaction processing method according to an embodiment of the present disclosure.

FIG. 2 illustrates a blockchain-based transaction processing method according to an embodiment of the present disclosure, and the transaction processing method may comprise the following steps. The method may be implementable by a node in a blockchain network.

S201: acquiring an operation instruction.

Here, the operation instruction may comprise to-be-operated account information and operation content.

In one embodiment, all nodes in the blockchain can receive transaction data input by a user and process the received transaction data, wherein the transaction data may be input by the user through an account logged in on the client of the node, by the user through another client and sent to the node, etc. Specific manner in which the transaction data is sent or input to the node is not limited in the present disclosure. Then, the operation instruction acquired by a node in the step S210 may also be treated as transaction data. This transaction data may be different from the transaction data described above, because this transaction data needs to be processed through a particular smart contract.

Assuming that an operation instruction is treated as transaction data, there are many types of transaction data, and the operation content comprised in the operation instruction may be carried in different forms in the transaction data. For example, when the blockchain is a blockchain with coins, the transaction data in a blockchain with coins can be transaction data corresponding to transactions, and therefore the operation content can be carried in transaction remarks of the transaction data; when the blockchain is a blockchain without coins, the transaction data in a blockchain without coins may correspond to transaction data that is not related to transactions, such as storage of registration information, identity verification transactions, etc., and therefore there may not be strict form specifications on specific contents of the transaction data. As a result, the operation content may also be treated directly as transaction data, which is not limited in the present disclosure.

In some embodiments, the node in the blockchain may be a terminal installed with the blockchain client, e.g., cell phone, tablet computer, personal computer and the like, or may be a system comprising a plurality of apparatuses. In this disclosure, the node can comprise a server, e.g., a server comprising an individual apparatus or a server system comprising a plurality of apparatuses.

S202: in response to determining that an account sending the operation instruction corresponds to an account issuing the operation instruction, determining a smart contract corresponding to the account issuing the operation instruction.

In one embodiment, when an operation instruction is acquired, the account issuing the operation instruction (the issuing account herein can be interpreted as the designated account in S101) is determined, an algorithm (e.g., a pre-selected or set algorithm) is used to determine a summary of the operation instruction, and a public key in a public-private key pair corresponding to the issuing account is used to encrypt the summary to obtain an encrypted summary.

The obtained encrypted summary is compared with the encrypted summary comprised in the operation instruction to see if they are the same.

If the obtained encrypted summary is the same as the encrypted summary comprised in the operation instruction, it is determined that the account sending the operation instruction is the same as the account issuing the operation instruction, which indicates that the acquired operation instruction is legal.

Here, the issuing account recorded in the various embodiments may be an account owned by a government agency or a trustful institution. Since corresponding smart contracts are created for different designated accounts, it indicates that operation instructions issued by the designated accounts are recognized. As a result, effective administrative supervision can be performed on all accounts in a blockchain network, and this type of supervision is limited, which will not restrict normal transactions in the blockchain network.

In one embodiment, to ensure the validity of subsequent operations, after an operation instruction is acquired, a digital signature (e.g., the encrypted summary) of the operation instruction can be further used to perform identity verification (also referred to as signature verification) on the designated account that sends the operation instruction to determine whether the account sending the operation instruction is a preset issuing account having the authority to send the operation instruction.

When determining that the account sending the operation instruction is the same as the account issuing the operation instruction, a smart contract corresponding to the account issuing the operation instruction can be further determined according to a preset mapping relationship between issuing accounts and smart contracts.

In one example, as shown in FIG. 1, smart contracts can be configured for different designated accounts, and a mapping relationship between designated accounts and smart contracts can be created:

TABLE 1

| Types of designated account (issuing account) | Smart contract | Operation content |
| --- | --- | --- |
| Supervision account of a judicial agency | Smart contract 1 | Freezing an account, unfreezing an account |
| Supervision account of a securities agency | Smart contract 2 | Suspension, resumption, closure, opening |
| Supervision account of an administrative agency | Smart contract 3 | Mandatory transfer |
| . . . | . . . | . . . |

In some embodiments, different operation contents of the same designated account can be configured with corresponding smart contracts. With a supervision account of a judicial agency as an example, a corresponding smart contract can be configured for a freezing operation, and also a corresponding smart contract can be configured for an unfreezing operation. These two smart contracts may be different from the smart contract 1 shown in Table 1.

In one embodiment a smart contract corresponding to the issuing account can be further determined according to the relationship shown in Table 1.

In one embodiment, furthermore, different designated accounts can be used to issue different operation instructions, wherein the operation instructions may include, but are not limited to: a freezing instruction, an unfreezing instruction, a suspension instruction, a resumption instruction, a closing instruction, an opening instruction, and a mandatory transfer instruction.

In one embodiment, furthermore, the above-described various operation instructions with different functions may be present, and the operation instructions all correspond to accounts corresponding to the to-be-operated account information. As a result, the operation instructions are mandatory in some embodiments. In other words, the designated account has authority of supervision on all other accounts in the blockchain, and therefore it is necessary to decentralize the authority of supervision. The decentralization of the supervision power not only can prevent an accident from occurring to one of the designated accounts (e.g., hijacked by criminals) that all supervision authority is lost, but also can prevent a user of an account that operates the designated object from abusing the authority, etc. Therefore, a plurality of designated accounts having the authority to send different operation instructions can be present.

In this way, the supervision power of the accounts in the blockchain can be decentralization, such that the supervision power against the blockchain is not centralized in one designated account and the effectiveness and credibility of supervision can be ensured. At the same time, it prevents the loss of all supervision power over the blockchain when one designated account is compromised.

S203: based on the smart contract, executing an operation according to the operation content on another account corresponding to the to-be-operated account information.

In one embodiment of the present disclosure, when the operation content satisfies an execution condition of the smart contract, an operation can be executed on an account corresponding to the to-be-operated account information according to a transaction processing logic corresponding to the operation content comprised in the smart contract.

For different operation contents, different operations are executed on an account corresponding to the to-be-operated account information. In some embodiments, the operation contents will be described in detail below in terms of freezing an account, unfreezing an account, suspending an account, resuming an account, closing an account, opening an account, and mandatory transfer of an account as examples.

If the operation content is to freeze an account, a freezing operation is executed on an account corresponding to the to-be-operated account information according to a transaction processing logic corresponding to account freezing comprised in the smart contract, the freezing operation being used to instruct to stop execution of transactions related to the to-be-operated account information.

In one example, when the operation instruction is a freezing instruction, the operation parameters corresponding to the operation instruction may include: a freezing type and an address of the frozen account, wherein the freezing type may comprise that sales and purchases are prohibited for the frozen account, only sales are allowed for the frozen account, purchases are prohibited for the frozen account, etc. Consequently, when a freezing operation is executed on an account corresponding to the to-be-operated account information, different freezing operations may be executed according to the freezing type.

If the operation content is to unfreeze an account, an unfreezing operation is executed on an account corresponding to the to-be-operated account information according to a transaction processing logic corresponding to account unfreezing comprised in the smart contract, the unfreezing operation being used to instruct to resume execution of transactions related to the to-be-operated account information.

In one embodiment, before executing an unfreezing operation on an account corresponding to the to-be-operated account information, the method further comprises: determining whether the account corresponding to the to-be-operated account information is in a frozen state.

When it is determined that the account corresponding to the to-be-operated account information is in a frozen state, an unfreezing operation is executed on the account corresponding to the to-be-operated account information.

If the operation content is to suspend an account, a suspending operation is executed on an account corresponding to the to-be-operated account information according to a transaction processing logic corresponding to account suspension comprised in the smart contract, the suspending operation being used to instruct the account corresponding to the to-be-operated account information to stop execution of transactions.

In one example, when the operation instruction is a suspending instruction, the operation parameters corresponding to the operation instruction may include: a suspending parameter, wherein the suspending parameter may be a suspension time period for the suspended account, e.g., a suspension starting time and a suspension ending time. When a suspending operation is executed on an account corresponding to the to-be-operated account information, the time to execute suspension on the account corresponding to the to-be-operated account information can be determined according to the suspending parameter, e.g., stopping the execution of transactions when the suspension starting time is reached; when the suspension ending time is reached, automatically releasing the suspended state, e.g., resuming the execution of transactions.

If the operation content is to resume an account, a resuming operation is executed on an account corresponding to the to-be-operated account information according to a transaction processing logic corresponding to account resumption comprised in the smart contract, the resuming operation being used to instruct the account corresponding to the to-be-operated account information to resume execution of transactions.

In one embodiment, before executing a resuming operation on an account corresponding to the to-be-operated account information, the method further comprises: determining whether the account corresponding to the to-be-operated account information is in a suspended state.

When it is determined that the account corresponding to the to-be-operated account information is in a suspended state, a resuming operation is executed on the account corresponding to the to-be-operated account information.

In some embodiments, if a suspended account receives a resuming operation before the suspension ending time is reached, it does not need to wait until the suspension ending time is reached, but can directly resume the execution of the received transaction instruction.

If the operation content is to close an account, a closing operation is executed on an account corresponding to the to-be-operated account information according to a transaction processing logic corresponding to account closure comprised in the smart contract, the closing operation being used to instruct to stop execution of transactions.

In one example, when a closing operation is executed on an account corresponding to the to-be-operated account information, an account information queue corresponding to the to-be-operated account information is determined, and a suspending operation is sequentially executed on an account corresponding to each piece of the account information in the account information queue.

If the operation content is to open an account, an opening operation is executed on an account corresponding to the to-be-operated account information according to a transaction processing logic corresponding to account opening comprised in the smart contract, the opening operation being used to resume execution of transactions.

In one embodiment, a closing operation can be treated as a set of closing operations executed on all accounts. For example, a general account on which a closing operation is executed corresponds to a plurality of sub-accounts. Once a closing operation is executed on the general account, it means that a suspending operation will be executed on the plurality of sub-accounts corresponding to the general account. In one embodiment, once a closing operation is executed on the general account, a group sending function can be used to send a suspending instruction to the sub-accounts controlled by the general account, which then realizes the execution of a suspending operation on all the sub-accounts, thereby achieving the effect that all the accounts in the blockchain are suspended at the same time, i.e., the effect of closure.

The opening principle is the same as the closing principle, while opening is a reverse situation to closure, which will not be repeated herein.

In one embodiment, furthermore, different states can be set for the accounts. When the state of the account is set to be an opening state, the account can normally execute transactions; when the state of the account is set to be a closed state, the account stops execution of transactions. Here, the states of the accounts are controlled through the closing instruction and the opening instruction. When closing is needed, a management account of a securities agency can send a closing instruction to invoke a corresponding smart contract, such that the states of the accounts are adjusted to the closing state; when opening is needed, the management account of the securities agency can send an opening instruction to invoke a corresponding smart contract, such that the states of the accounts are adjusted to the opening state, thereby achieving an effect to control opening and closing of the blockchain.

In one embodiment, furthermore, script codes can be compiled on the node logged in by the designated account with respect to the sending of the closing instruction and the opening instruction, such that the node automatically sends the closing instruction and the opening instruction to achieve a goal of controlling opening and closing of the accounts.

In one example, the script codes can be JavaScript or the like, and the account information (e.g., account identifiers) of the accounts in the blockchain can be stored in the script codes or the node. When a designated account needs to send the closing instruction, the script codes can be run such that the script codes automatically execute, according to the stored account information of the accounts, a suspending operation on the accounts, respectively, to achieve an effect that all accounts in the blockchain are suspended (i.e., an effect of closure).

If the operation content is a mandatory transfer, a mandatory transfer operation is executed on an account corresponding to the to-be-operated account information according to a transaction processing logic corresponding to mandatory transfer comprised in the smart contract, the mandatory transfer operation being used for mandatory transfer of a set quantity of resources from the account corresponding to the to-be-operated account information according to the operation content.

In one example, when the operation instruction is a mandatory transfer instruction, the operation parameters corresponding to the operation instruction may include: an address of the transfer-in account, an address of the transfer-out account, and a quantity limit of mandatory transfer. When a mandatory transfer operation is executed on an account corresponding to the to-be-operated account information, a transaction can be initiated according to the address of the transfer-in account, the address of the transfer-out account, and the quantity limit of mandatory transfer, mandatorily transferring the quantity limit out of the transfer-out account into the transfer-in account.

Therefore, with the method above, a designated account in the blockchain can perform supervision on all accounts through particular smart contracts. Since the specific contents of the smart contracts can be compiled by staff according to the need of practical applications, the designated account is enabled to enforce transactions on all accounts in the blockchain, thereby achieving supervision on the accounts in the blockchain. Since the operation instruction can be stored in a block of the blockchain, the operation instruction is unchangeable and can be queried. Namely, the operation instruction is certified, such that the activities of accounts of all designated objects are open and transparent, which facilitates identification of activities that abuse the authority and consequently improves the credibility of accounts of all the designated objects. Furthermore, the decentralization of authority of supervision on accounts of different designated objects can further avoid the possibility that the accounts on the blockchain are affected due to comprising the account of a designated object. While avoiding normal operations of all accounts on the blockchain, the method according to the various embodiments can add the authority of supervision on all the accounts, which solves the problem of difficult supervision according to the existing blockchain technology.

With the solutions according to the embodiments of the present disclosure, corresponding smart contracts are created for different administrative supervision accounts (also referred to as designated accounts). In this way, upon receiving an operation instruction sent from a designated account, a node in a blockchain network can invoke a corresponding smart contract when determining that the operation instruction is issued legally, to execute corresponding operations on an account corresponding to the to-be-operated account information, which achieves a goal of supervision on accounts in the blockchain and solves the problem of processing special transactions like administrative intervention in a blockchain.

Figure 3:
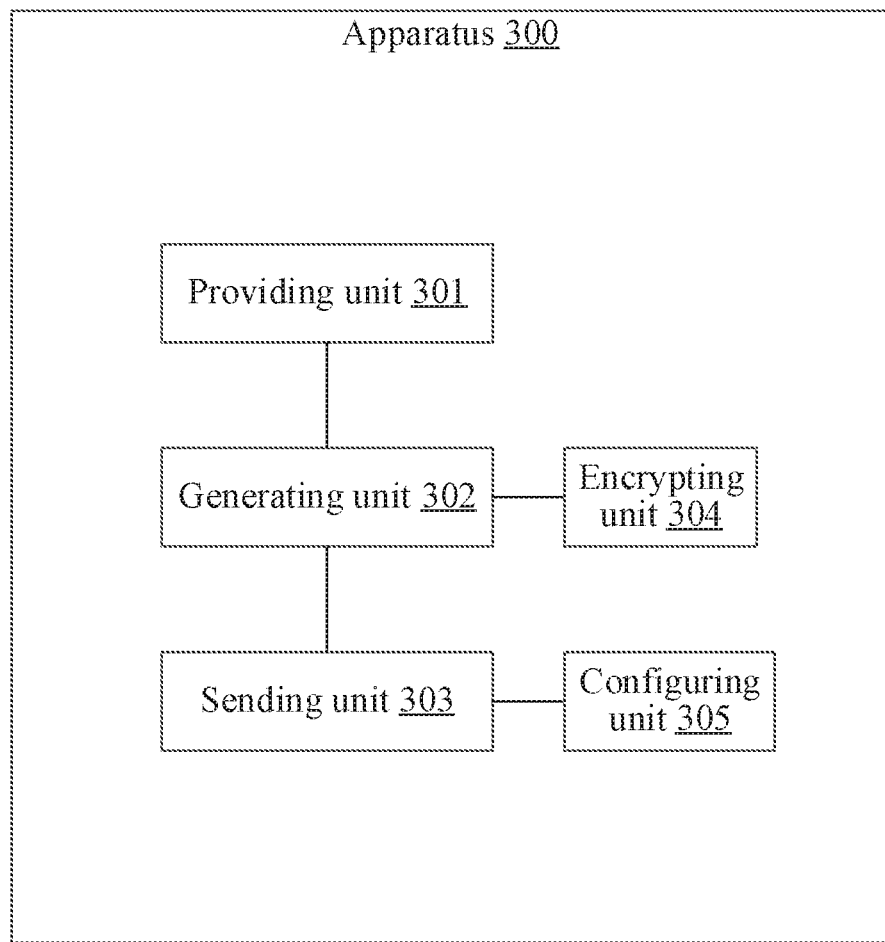
FIG. 3 is a structural schematic diagram of a blockchain-based transaction processing apparatus according to an embodiment of the present disclosure.

On the basis of the blockchain-based transaction processing method shown in FIG. 1, the disclosure correspondingly provides a structural schematic diagram of a blockchain-based transaction processing apparatus, as shown in FIG. 3.

FIG. 3 is a structural schematic diagram of a blockchain-based transaction processing apparatus 300 according to an embodiment of the present disclosure. The apparatus 300 may comprise a providing unit 301, a generating unit 302, and a sending unit 303.

The providing unit 301 optionally provides an application client for a designated account.

The generating unit 302 generates, in response to the designated account being logged in through the application client and according to input to-be-operated account information and operation content, an operation instruction comprising the to-be-operated account information and the operation content.

The sending unit 303 sends the operation instruction to a node in the blockchain network, causing the node in the blockchain network to invoke a smart contract corresponding to the designated account upon receiving the operation instruction, and to execute an operation according to the operation content on another account corresponding to the to-be-operated account information.

In one embodiment, the transaction processing apparatus further comprises an encrypting unit 304.

The encrypting unit 304 uses, when generating the operation instruction, an algorithm to determine a summary of the operation instruction, and uses a private key in a public-private key pair corresponding to the designated account to encrypt the summary to obtain an encrypted summary. Sending the operation instruction by the sending unit 303 to a node in the blockchain comprises sending the encrypted summary and the operation instruction to a node in the blockchain.

In one embodiment, for different designated accounts, the corresponding public-private key pairs are different.

In one embodiment, the transaction processing apparatus further comprises a configuring unit 305.

The configuring unit 305 configures smart contracts for different designated accounts according to attributes of the designated accounts, the smart contracts being used to execute operations according to operation instructions sent by the designated accounts, and different designated accounts having different corresponding smart contracts.

According to one aspect of the present disclosure, the units 301-305 are software functional units stored in a memory, e.g., a non-transitory and computer-readable memory. The apparatus 300 may include a processor for executing the software functional units 301-305 to perform the relevant functions. According to another aspect, the units 301-305 may be implemented by hardware, e.g., circuitry programmed to perform the functionalities.

Figure 4:
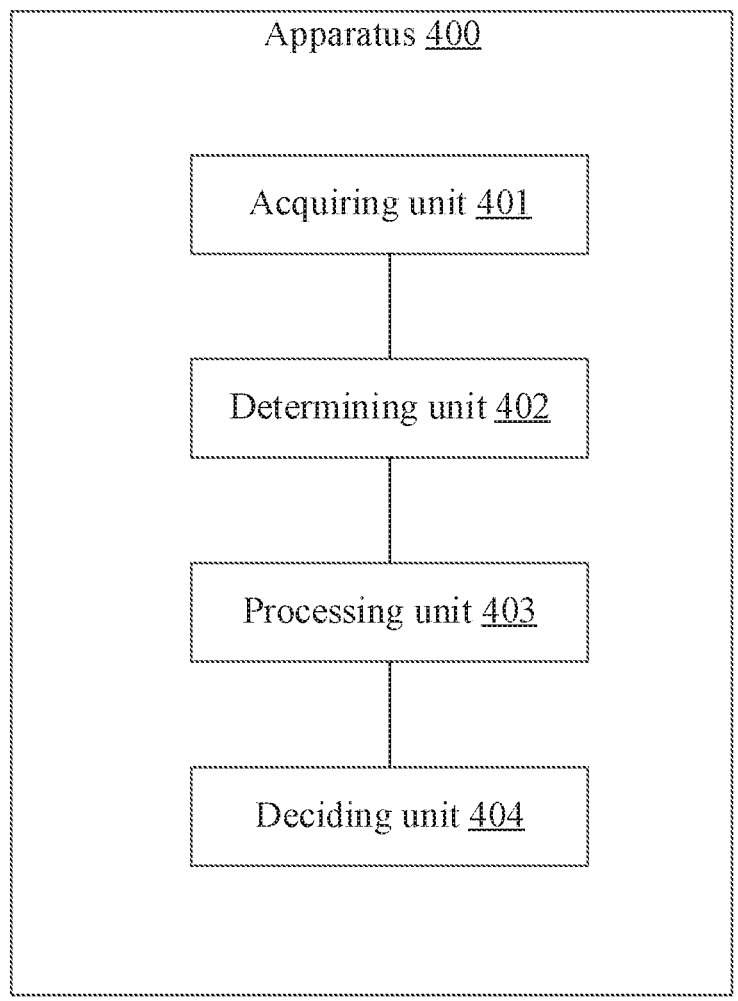
FIG. 4 is a structural schematic diagram of a blockchain-based transaction processing apparatus according to an embodiment of the present disclosure.

On the basis of the blockchain-based transaction processing method shown in FIG. 2, the present disclosure further correspondingly provides a structural schematic diagram of a blockchain-based transaction processing apparatus, as shown in FIG. 4.

FIG. 4 is a structural schematic diagram of a blockchain-based transaction processing apparatus 400 according to an embodiment of the present disclosure. The apparatus 400 may comprise an acquiring unit 401, a determining unit 402, and a processing unit 403.

The acquiring unit 401 acquires an operation instruction comprising to-be-operated account information and operation content.

The determining unit 402 in response to determining that an account sending the operation instruction corresponds to an account issuing the operation instruction, determines a smart contract corresponding to the account issuing the operation instruction.

The processing unit 403 executes, based on the smart contract, an operation according to the operation content on another account corresponding to the to-be-operated account information.

In another embodiment, the "determining by the determining unit 402 a smart contract corresponding to the issuing account" comprises: determining, according to a preset mapping relationship between issuing accounts and smart contracts, a smart contract corresponding to the account issuing the operation instruction.

In one embodiment, the "determining by the determining unit 402 that the account sending the operation instruction is the same as the account issuing the operation instruction" comprises: using an algorithm to determine a summary of the operation instruction, and using a public key in a public-private key pair corresponding to the issuing account to encrypt the summary to obtain an encrypted summary; and if the obtained encrypted summary is the same as the encrypted summary comprised in the operation instruction, determining that the account sending the operation instruction is the same as the account issuing the operation instruction.

In one embodiment, the "executing, by the processing unit 403 on the basis of the smart contract, an operation according to the operation content on an account corresponding to the to-be-operated account information" comprises: when the operation content satisfies an execution condition of the smart contract, executing an operation on an account corresponding to the to-be-operated account information according to a transaction processing logic corresponding to the operation content comprised in the smart contract.

In one embodiment, the "executing by the processing unit 403 an operation on an account corresponding to the to-be-operated account information according to a transaction processing logic corresponding to the operation content comprised in the smart contract" comprises: if the operation content is to freeze an account, executing a freezing operation on an account corresponding to the to-be-operated account information according to a transaction processing logic corresponding to account freezing comprised in the smart contract, the freezing operation being used to instruct to stop execution of transactions related to the to-be-operated account information.

In one embodiment, the "executing by the processing unit 403 an operation on an account corresponding to the to-be-operated account information according to a transaction processing logic corresponding to the operation content comprised in the smart contract" comprises: if the operation content is to unfreeze an account, executing an unfreezing operation on an account corresponding to the to-be-operated account information according to a transaction processing logic corresponding to account unfreezing comprised in the smart contract, the unfreezing operation being used to instruct to resume execution of transactions related to the to-be-operated account information.

In one embodiment, the apparatus further comprises a deciding unit 404, wherein: the deciding unit 404 determines, before executing an unfreezing operation on an account corresponding to the to-be-operated account information, whether the account corresponding to the to-be-operated account information is in a frozen state.

The "executing by the processing unit 403 an unfreezing operation on an account corresponding to the to-be-operated account information" comprises: when it is determined that the account corresponding to the to-be-operated account information is in a frozen state, executing an unfreezing operation on the account corresponding to the to-be-operated account information.

In one embodiment, the "executing by the processing unit 403 an operation on an account corresponding to the to-be-operated account information according to a transaction processing logic corresponding to the operation content comprised in the smart contract" comprises: if the operation content is to suspend an account, executing a suspending operation on an account corresponding to the to-be-operated account information according to a transaction processing logic corresponding to account suspension comprised in the smart contract, the suspending operation being used to instruct the account corresponding to the to-be-operated account information to stop execution of transactions.

In one embodiment, the "executing by the processing unit 403 an operation on an account corresponding to the to-be-operated account information according to a transaction processing logic corresponding to the operation content comprised in the smart contract" comprises: if the operation content is to resume an account, executing a resuming operation on an account corresponding to the to-be-operated account information according to a transaction processing logic corresponding to account resumption comprised in the smart contract, the resuming operation being used to instruct the account corresponding to the to-be-operated account information to resume execution of transactions.

In one embodiment, before executing a resuming operation on an account corresponding to the to-be-operated account information, the deciding unit 404 determines whether the account corresponding to the to-be-operated account information is in a suspended state.

The "executing by the processing unit 403 a resuming operation on an account corresponding to the to-be-operated account information" comprises: when it is determined that the account corresponding to the to-be-operated account information is in a suspended state, executing a resuming operation on the account corresponding to the to-be-operated account information.

In one embodiment, the "executing by the processing unit 403 an operation on an account corresponding to the to-be-operated account information according to a transaction processing logic corresponding to the operation content comprised in the smart contract" comprises: if the operation content is to close an account, executing a closing operation on an account corresponding to the to-be-operated account information according to a transaction processing logic corresponding to account closure comprised in the smart contract, the closing operation being used to instruct to stop execution of transactions.

In one embodiment, the "executing by the processing unit 403 a closing operation on an account corresponding to the to-be-operated account information" comprises: determining an account information queue corresponding to the to-be-operated account information, and sequentially executing a suspending operation on an account corresponding to each piece of the account information in the account information queue.

In one embodiment, the "processing unit 403 executing an operation on an account corresponding to the to-be-operated account information according to a transaction processing logic corresponding to the operation content comprised in the smart contract" comprises: if the operation content is to open an account, executing an opening operation on an account corresponding to the to-be-operated account information according to a transaction processing logic corresponding to account opening comprised in the smart contract, the opening operation being used to resume execution of transactions.

In one embodiment, the "executing by the processing unit 403 an operation on an account corresponding to the to-be-operated account information according to a transaction processing logic corresponding to the operation content comprised in the smart contract" comprises: if the operation content is a mandatory transfer, executing a mandatory transfer operation on an account corresponding to the to-be-operated account information according to a transaction processing logic corresponding to mandatory transfer comprised in the smart contract, the mandatory transfer operation being used for mandatory transfer of a set quantity of resources from the account corresponding to the to-be-operated account information according to the operation content.

In one example, the blockchain-based transaction processing apparatus as shown in FIG. 4 can be disposed in a node of a blockchain network. The node may comprise a server that is an individual apparatus or a system comprising a plurality of apparatuses. Alternatively, the node may comprise a terminal, e.g., cell phone, tablet computer, personal computer and the like. According to one aspect of the present disclosure, the units 401-403 are software functional units stored in a memory, e.g., a non-transitory and computer-readable memory. The apparatus 400 may include a processor for executing the software functional units 401-403 to perform the relevant functions. According to another aspect, the units 401-403 may be implemented by hardware, e.g., circuitry programmed to perform the functionalities.

In some embodiments, the transaction processing apparatus may be implemented in a software manner or a hardware manner, which is not limited herein. Upon receiving an operation instruction, the transaction processing apparatus can effectively determine whether the issuing of the operation instruction is legal. If it is legal, the transaction processing apparatus invokes a corresponding smart contract, executes corresponding operations on an account corresponding to the to-be-operated account information, and achieves supervision on accounts in the blockchain and processing special transactions like administrative intervention in a blockchain.

In the 1990s, an improvement to a technology could be differentiated into a hardware improvement (e.g. an improvement to a circuit structure, such as a diode, a transistor, a switch, and the like) or a software improvement (an improvement to a flow of a method). Along with the technological development, however, many current improvements to method flows can be deemed as direct improvements to hardware circuit structures. Designers can obtain a corresponding hardware circuit structure by programming an improved method flow into a hardware circuit. Therefore, an improvement to a method flow can be realized by hardware implementation. For example, Programmable Logic Device (PLD) (e.g., Field Programmable Gate Array (FPGA)) is such an integrated circuit that its logic functions are determined by a user through programming the device. A designer can program to "integrate" a digital system onto one piece of PLD, without asking a chip manufacturer to design and manufacture a dedicated IC chip. At present, this type of programming has mostly been implemented through "logic compiler" software, rather than manually manufacturing the IC chips. The logic compiler software is similar to a software compiler used for program development and writing, while a particular programming language is used for writing source codes prior to compiling, which is referred to as a Hardware Description Language (HDL). There is not just one, but many types of HDL, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language).

The most commonly used HDL includes VHDL (Very-High-Speed Integrated Circuit Hardware Description Language) and Verilog. A person skilled in the art would have known obtaining a hardware circuit to implement a logic method flow by using the above HDLs to perform some logic programming on the method flow and program it into an IC.

A controller may be implemented in any proper manner. For example, a controller may be in, for example, a form of a microprocessor or processor, as well as a computer readable medium that stores computer readable program codes (e.g. software or firmware) capable of being executed by the (micro) processor, a logic gate, a switch, an Application Specific Integrated Circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. A memory controller may further be implemented as a part of a control logic of a memory. A person skilled in the art should also be aware that, in addition to that a controller is implemented in a manner of pure computer readable program codes, it is feasible to perform logic programming on steps of a method to enable a controller to implement the same functions in a form of a logic gate, a switch, an ASIC, a programmable logic controller and an embedded microcontroller. Therefore, such a controller can be deemed as a hardware part, while devices comprised therein and configured to carry out various functions may also be deemed as a structure inside the hardware part. Alternatively, devices configured to carry out various functions may be deemed as both software modules to implement a method and a structure inside a hardware part.

The system, apparatus, module or unit described in the above embodiments may be implemented by a computer chip or entity or implemented by a product having a function. A typical implementation device is a computer. For example, a computer may be, for example, a personal computer, a laptop computer, a cellular phone, a camera phone, a smart phone, a personal digital assistant, a medium player, a navigation device, an email apparatus, a game console, a tablet computer, a wearable device or a combination of any devices in these devices.

For convenience of description, the above apparatus is divided into various units according to functions for description. Functions of the units may be implemented in one or multiple pieces of software and/or hardware when implementing the present disclosure.

A person skilled in the art should understand that the embodiments of the present disclosure may be provided as a method, a system, or a computer program product. Therefore, the disclosed system may be implemented as a complete hardware embodiment, a complete software embodiment, or an embodiment combing software and hardware for performing the disclosed methods. Moreover, the disclosed system may be in the form of a computer program product implemented on one or more computer usable storage media (including, but not limited to, a magnetic disk memory, CD-ROM, an optical memory, and the like) comprising computer usable program codes therein.

The disclosed system is described with reference to flowcharts and/or block diagrams of the method, device (system) and computer program product according to the embodiments of the present disclosure. A computer program instruction may be used to implement each process and/or block in the flowcharts and/or block diagrams and a combination of processes and/or blocks in the flowcharts and/or block diagrams. These computer program instructions may be provided for a general-purpose computer, a special-purpose computer, an embedded processor, or a processor of other programmable data processing devices to generate a machine, so that the instructions executed by a computer or a processor of other programmable data processing devices generate an apparatus for implementing a specified function in one or more processes in the flowcharts and/or in one or more blocks in the block diagrams.

These computer program instructions may also be stored in a computer readable memory that can instruct a computer or other programmable data processing devices to work in a particular manner, such that the instructions stored in the computer readable memory generate a manufactured article that includes an instruction apparatus. The instruction apparatus implements one or more functions in one or more processes in the flowcharts and/or in one or more blocks in the block diagrams.

These computer program instructions may also be loaded onto a computer or other programmable data processing devices, such that a series of operational steps are performed on the computer or other programmable devices, thereby generating computer-implemented processing. Therefore, the instructions executed on the computer or other programmable devices provide steps for implementing one or more functions in one or more processes in the flowcharts and/or in one or more blocks in the block diagrams.

In a typical configuration, the computation device includes one or more Central Processing Units (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

The terms of "including", "comprising" or any other variants thereof intend to encompass a non-exclusive inclusion, such that a process, method, commodity or device comprising a series of elements not only comprises these elements, but also comprises other elements that are not listed, or further comprises elements that are inherent to the process, method, commodity or device. When there is no further restriction, elements defined by the statement "comprising one . . . " does not exclude additional similar elements in a process, method, commodity or device that comprises the defined elements.

A person skilled in the art should understand that the embodiments of the present disclosure may be provided as a method, a system, or a computer program product. Therefore, the present disclosure may be implemented as a complete hardware embodiment, a complete software embodiment, or an embodiment combing software and hardware. Moreover, the present disclosure may be in the form of a computer program product implemented on one or more computer usable storage media (including, but not limited to, a magnetic disk memory, CD-ROM, an optical memory, and the like) comprising computer usable program codes therein.

The present disclosure may be described in a regular context of a computer executable instruction that is executed by a computer, such as a program module. In various embodiments, the program module comprises a routine, a program, an object, a component, a data structure, and the like for executing a particular task or implementing a particular abstract data type. The present disclosure may also be practiced in distributed computing environments. In these distributed computing environments, remote processing devices connected via communication networks carry out tasks. In the distributed computing environments, a program module can be located in local and remote computer storage media, including storage devices.

The embodiments in this description are described in a progressive manner with each embodiment focusing on differences from other embodiments, and the embodiments may be mutually referenced for identical or similar parts thereof. For the system embodiment, the description thereof is relatively simple as it is substantially similar to the method embodiment. The description of the method embodiment may be referenced for related parts thereof.

The embodiments of the present disclosure are merely exemplary, and are not used to limit the present disclosure. To a person skilled in the art, the disclosed embodiments can be modified or changed in various ways. Any modification, equivalent substitution or improvement made within the spirit and principle of the present disclosure shall be encompassed by the claims of the present disclosure.

The invention claimed is:

1. A blockchain-based transaction processing method implementable by a node in a blockchain network, the method comprising:
  acquiring an operation instruction from an account, the operation instruction comprising to-be-operated account information of another account in need of administrative supervision and operation content;
  determining whether the account sending the operation instruction corresponds to an account issuing the operation instruction;
  in response to determining that the account sending the operation instruction corresponds to the account issuing the operation instruction, determining, according to at least a first mapping relationship between issuing accounts and smart contracts, a smart contract corresponding to the account issuing the operation instruction, wherein the account issuing the operation instruction is a designated account having one or more administrative supervision capabilities over the other account corresponding to the to-be-operated account information through one or more smart contracts corresponding to the designated account; and
  invoking the smart contract to execute an operation according to the operation content on the other account corresponding to the to-be-operated account information.

2. The method of claim 1, wherein determining that the account sending the operation instruction corresponds to the account issuing the operation instruction comprises:
  generating a summary of the operation instruction;
  using a public key in a public-private key pair corresponding to the account issuing the operation instruction to encrypt the summary to obtain an encrypted summary; and
  determining whether the encrypted summary corresponds to an encrypted summary comprised in the operation instruction.

3. The method of claim 1, wherein invoking the smart contract to execute the operation according to the operation content on the other account comprises: in response to the operation content satisfying an execution condition of the smart contract, executing the operation on the other account according to a transaction processing logic corresponding to the operation content comprised in the smart contract.

4. The method of claim 3, wherein executing the operation on the other account according to the transaction processing logic comprises: in response to the operation content being to freeze an account, executing a freezing operation on the other account according to the transaction processing logic, the freezing operation executed on the other account being used to instruct to stop execution of transactions related to the to-be-operated account information.

5. The method of claim 3, wherein executing the operation on the other account according to the transaction processing logic comprises: in response to the operation content being to unfreeze an account, executing an unfreezing operation on the other account according to the transaction processing logic, the unfreezing operation executed on the other account being used to instruct to resume execution of transactions related to the to-be-operated account information.

6. The method of claim 5, further comprising: before executing the unfreezing operation on the other account, determining that the other account is in a frozen state; and wherein executing the unfreezing operation on the other account comprises: in response to determining that the other account is in the frozen state, executing the unfreezing operation on the other account.

7. The method of claim 3, wherein executing the operation on the other account according to the transaction processing logic comprises: in response to the operation content being to suspend an account, executing a suspending operation on the other account according to the transaction processing logic, the suspending operation executed on the other account being used to instruct the other account to stop execution of transactions.

8. The method of claim 3, wherein executing the operation on the other account according to the transaction processing logic comprises: in response to the operation content being to resume an account, executing a resuming operation on the other account according to the transaction processing logic, the resuming operation executed on the other account being used to instruct the other account to resume execution of transactions.

9. The method of claim 8, further comprising: before executing the resuming operation on the other account, determining whether the other account is in a suspended state; and wherein executing the resuming operation on the other account comprises: in response to determining that the other account is in the suspended state, executing the resuming operation on the other account.

10. The method of claim 3, wherein executing the operation on the other account according to the transaction processing logic comprises: in response to the operation content being to close an account, executing a closing operation on the other account according to the transaction processing logic, the closing operation executed on the other account being used to instruct to stop execution of transactions.

11. The method according to claim 10, wherein executing the closing operation on the other account, comprises:
determining an account information queue corresponding to the to-be-operated account information; and
sequentially executing a suspending operation on each account corresponding to each piece of the account information in the account information queue.

12. The method of claim 3, wherein executing the operation on the other account according to the transaction processing logic comprises: in response to the operation content being to open an account, executing an opening operation on the other account according to the transaction processing logic.

13. The method of claim 3, wherein executing the operation on the other account according to the transaction processing logic comprises: in response to the operation content being a mandatory transfer, executing a mandatory transfer operation on the other account according to the transaction processing logic, the mandatory transfer operation being used for mandatory transfer of a quantity of resources from the other account according to the operation content.

14. The method of claim 1, wherein determining the smart contract corresponding to the account issuing the operation instruction, comprises: selecting the smart contract based on a second mapping relationship between different operation contents and different smart contracts corresponding to the account issuing the operation instruction.

15. The method of claim 1, wherein determining that the account sending the operation instruction corresponds to the account issuing the operation instruction, comprises: decrypting the operation instruction and verifying whether it is signed by the account issuing the operation instruction.

16. A blockchain-based transaction processing apparatus, comprising a processor and a non-transitory computer-readable storage medium storing instructions that, when executed by the processor, cause the apparatus to perform a method, the method comprising:
acquiring an operation instruction from an account, the operation instruction comprising to-be-operated account information of another account in need of administrative supervision and operation content;
determining whether the account sending the operation instruction corresponds to an account issuing the operation instruction;
in response to determining that the account sending the operation instruction corresponds to the account issuing the operation instruction, determining, according to at least a first mapping relationship between issuing accounts and smart contracts, a smart contract corresponding to the account issuing the operation instruction, wherein the account issuing the operation instruction is a designated account having one or more administrative supervision capabilities over the other account corresponding to the to-be-operated account information through one or more smart contracts corresponding to the designated account; and
invoking the smart contract to execute an operation according to the operation content on the other account corresponding to the to-be-operated account information.

17. The apparatus of claim 16, wherein determining that the account sending the operation instruction corresponds to the account issuing the operation instruction comprises:
generating a summary of the operation instruction;
using a public key in a public-private key pair corresponding to the account issuing the operation instruction to encrypt the summary to obtain an encrypted summary; and
determining whether the encrypted summary corresponds to an encrypted summary comprised in the operation instruction.

18. The apparatus of claim 16, wherein invoking the smart contract to execute the operation according to the operation content on the other account comprises: in response to the operation content satisfying an execution condition of the smart contract, executing the operation on the other account according to a transaction processing logic corresponding to the operation content comprised in the smart contract.

19. A non-transitory computer-readable storage medium storing instructions that, when executed by a processor, cause the processor to perform a method, the method comprising:
acquiring an operation instruction from an account, the operation instruction comprising to-be-operated account information of another account in need of administrative supervision and operation content;
determining whether the account sending the operation instruction corresponds to an account issuing the operation instruction;
in response to determining that the account sending the operation instruction corresponds to the account issuing the operation instruction, determining, according to at least a first mapping relationship between issuing accounts and smart contracts, a smart contract corresponding to the account issuing the operation instruction, wherein the account issuing the operation instruction is a designated account having one or more administrative supervision capabilities over the other account corresponding to the to-be-operated account information through one or more smart contracts corresponding to the designated account; and
invoking the smart contract to execute an operation according to the operation content on the other account corresponding to the to-be-operated account information.

* * * * *